Patented July 14, 1925.

1,545,848

UNITED STATES PATENT OFFICE.

ALBERT E. PENFOLD, OF BIRMINGHAM, ENGLAND, ASSIGNOR TO DUNLOP TIRE AND RUBBER CORPORATION OF AMERICA, OF BUFFALO, NEW YORK, A CORPORATION OF NEW YORK.

GOLF BALL.

No Drawing. Application filed May 17, 1924. Serial No. 714,183.

*To all whom it may concern:*

Be it known that I, ALBERT ERNEST PENFOLD, a subject of Great Britain, and resident of Birmingham, England, have invented certain new and useful Improvements in Golf Balls, of which the following is a specification.

This invention relates to improvements in golf balls and its object is to provide an improved composition and structure and particularly an improved center or core for such balls.

According to this invention we provide a golf ball having its center or core comprising, that is composed wholly or partly of, a mixture of rubber with resin. A good example of such a core can be made up of a suitable quantity of unvulcanized india rubber mixed with a quantity of resinous oil which is extracted from raw balata and generally known as balata resin preferably in the proportion of two and one-half parts by weight, of balata resin to one of india rubber.

The mixing may be carried out by any of the known methods. Suitable filling and vulcanizing ingredients are added. An example of a compound suitable for our purpose is as follows:

| | Parts by weight. |
|---|---|
| Para rubber | 12 |
| Balata resin | 30 |
| Litharge | 55½ |
| Sulphur | 2½ |
| | 100 |

A softer or more yielding compound may be obtained by increasing the ratio of balata resin to that of rubber. The filling and vulcanizing agents may be varied to suit requirements.

The compound is then molded and vulcanized into the desired shape and a thin coating of gelatine solution or other substance such as will prevent the oil permeating into the remainder of the ball is then placed upon the said core.

The gelatine solution is preferably composed as follows:

| | Parts by weight. |
|---|---|
| Gelatine | 11 |
| Glycerine | 5 |
| Water | 84 |
| | 100 |

The solution may be applied to the core by dipping or any other known means. The remainder of the ball may be built up upon the core in any known manner, for example, strips of rubber tape may be wound thereupon and an outer cover molded thereon in the ordinary way.

Though I have described with great particularity of detail a certain embodiment of my invention, yet it is not to be understood therefrom that the invention is restricted to the particular embodiment disclosed. Various modifications thereof in detail may be made by those skilled in the art without departure from the invention as defined in the following claims.

What I claim is:

1. A golf ball having a center comprising india rubber mixed with resinous oil extracted from balata, the center being vulcanized before the remainder of the ball is built thereon.

2. A golf ball as in claim 1, the proportion of the resinous oil to india rubber being approximately two and a half parts to one by weight.

3. A golf ball as in claim 1, with a thin coating of a gelatinous substance surrounding the center to prevent the resinous oil from escaping into the remainder of the ball.

In witness whereof, I have hereunto signed my name.

ALBERT E. PENFOLD.